United States Patent
Nikoleris et al.

(10) Patent No.: US 10,628,318 B2
(45) Date of Patent: Apr. 21, 2020

(54) CACHE SECTOR USAGE PREDICTION

(71) Applicant: ARM Limited, Cambridge (GB)

(72) Inventors: Nikos Nikoleris, London (GB); Andreas Lars Sandberg, Cambridge (GB); Jonas Švedas, Cambridge (GB); Stephan Diestelhorst, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 15/882,104

(22) Filed: Jan. 29, 2018

(65) Prior Publication Data

US 2018/0232313 A1 Aug. 16, 2018

(30) Foreign Application Priority Data

Feb. 16, 2017 (GR) .............................. 20170100067

(51) Int. Cl.
*G06F 12/0871* (2016.01)
*G06F 12/084* (2016.01)
(Continued)

(52) U.S. Cl.
CPC .......... *G06F 12/0871* (2013.01); *G06F 3/064* (2013.01); *G06F 12/084* (2013.01); *G06F 12/0808* (2013.01); *G06F 12/0811* (2013.01); *G06F 12/0862* (2013.01); *G06F 12/0895* (2013.01); *G06F 2212/6026* (2013.01)

(58) Field of Classification Search
CPC .... G06F 3/064; G06F 12/0871; G06F 12/084; G06F 12/0862; G06F 12/0895; G06F 2212/6026

See application file for complete search history.

(56) References Cited

U.S. PATENT DOCUMENTS 6,098,154 A * 8/2000 Lopez-Aguado ............................ G06F 12/0897
711/118
6,216,219 B1 * 4/2001 Cai ........................ G06F 9/3806
712/207

(Continued)

OTHER PUBLICATIONS

Johnson et al "Run-Time Cache Bypassing" IEEE Transactions on Computers, vol. 48, No. 12, p. 1338-1354 Dec. 1999 [online]. [retrieved on Dec. 31, 2019]. Retrieved from the Internet <URL: https://ieeexplore.ieee.org/document/817393> (Year: 1999).*

(Continued)

*Primary Examiner* — David Yi
*Assistant Examiner* — Dustin B. Fulford
(74) *Attorney, Agent, or Firm* — Nixon & Vanderhye PC

(57) ABSTRACT

A system cache and method of operating a system cache are provided. The system cache provides data caching in response to data access requests from plural system components. The system cache has data caching storage with plural entries, each entry storing a block of data items and each block of data items comprising plural sectors of data items. Sector use prediction circuitry is provided which stores a set of sector use pattern entries. In response to a data access request received from a system component specifying one or more data items, a pattern entry is selected and a sector use prediction is generated in dependence on a sector use pattern in the selected pattern entry. Further data items may then be retrieved which are not specified in the data access request but are indicated by the sector use prediction.

17 Claims, 9 Drawing Sheets

(51) Int. Cl.
*G06F 3/06* (2006.01)
*G06F 12/0862* (2016.01)
*G06F 12/0895* (2016.01)
*G06F 12/0808* (2016.01)
*G06F 12/0811* (2016.01)

(56) References Cited

U.S. PATENT DOCUMENTS

2014/0047181 A1* 2/2014 Peterson ............. G06F 12/0873
 711/118
2015/0378919 A1* 12/2015 Anantaraman ..... G06F 12/0862
 711/122

OTHER PUBLICATIONS

Johnson et al "Run-Time Cache Bypassing" IEEE Transactions on Computers, vol. 48, No. 12, p. 1338-1354 Dec. 1999 [online]. [retrieved on Dec. 31, 2018]. Retrieved from the Internet <URL: https://ieeexplore.ieee.org/document/817393> (Year: 1999).*
McFarling, Scott "Combining Branch Predictors" [online] WRL Technical Note TN-36 Jun. 1993 [retrieved on Jan. 2, 2019]. Retrieved from the Internet <URL: http://www.hpl.hp.com/techreports/Compaq-DEC/WRL-TN-36.pdf> (Year: 1993).*

* cited by examiner

CACHE SECTOR USAGE PREDICTION

This application claims priority to GR Patent Application No. 20170100067 filed 16 Feb. 2017, the entire contents of which is hereby incorporated by reference.

The present disclosure relates to data caching in a data processing apparatus. More particularly, it refers to a system cache which provides data caching in response to data access requests from plural system components.

When providing a cache the storage cost associated with storing an identifying address portion (typically referred to as a "tag") in association with a block of data can be reduced by increasing the size of the cache block, as a larger amount of data can then be associated with each tag, and fewer tags must be stored for a given data size of cache. However, this approach also comes at the cost of generally requiring more bandwidth (to and from memory), because on every fill and write-back the whole block has to be fetched or written back. Furthermore, caches with larger blocks may also suffer from poor cache block utilisation, which wastes cache capacity and memory access bandwidth. To address these issues a "sector cache" may be used which uses larger cache blocks, but allows fills or write-backs of smaller "sectors" of each block. Such a sector cache also typically maintains separate valid and dirty bits for each sector. This approach means that cache block utilisation can be improved and memory bandwidth consumption can be reduced, because sectors that are not used do not need to be fetched and non-dirty sectors do not need to be written back.

At least one example described herein provides a system cache to provide data caching in response to data access requests from plural system components, the system cache comprising:
data caching storage having plural entries, each entry to store a block of data items and each block of data items comprising plural sectors of data items, and each block of data items being stored in an entry of the data caching storage with an associated address portion,
sector use prediction circuitry having a set of pattern entries to store a set of sector use patterns and responsive to a data access request received from a system component specifying one or more data items to select a selected pattern entry in dependence on a system component identifier in the data access request, and to generate a sector use prediction in dependence on a sector use pattern in the selected pattern entry; and
data retrieval circuitry to retrieve one or more further data items in dependence on the sector use prediction.

At least one example described herein provides a method of operating a system cache to provide data caching in response to data access requests from plural system components, the method comprising the steps of:
storing blocks of data items in plural entries of data caching storage, each entry storing a block of data items and each block of data items comprising plural sectors of data items, and each block of data items being stored in an entry of the data caching storage with an associated address portion;
storing sets of sector use patterns in a set of pattern entries and in response to a data access request received from a system component specifying one or more data items selecting a selected pattern entry in dependence on a system component identifier in the data access request, and generating a sector use prediction in dependence on the sector use pattern in the selected pattern entry; and
retrieving one or more further data items in dependence on the sector use prediction.

At least one example described herein provides a system cache to provide data caching in response to data access requests from plural system components, the system cache comprising:
means for storing blocks of data items in plural entries of data caching storage, each entry storing a block of data items and each block of data items comprising plural sectors of data items, and each block of data items being stored in an entry of the data caching storage with an associated address portion;
means for storing sets of sector use patterns in a set of pattern entries and in response to a data access request received from a system component specifying one or more data items selecting a selected pattern entry in dependence on a system component identifier in the data access request, and for generating a sector use prediction in dependence on the sector use pattern in the selected pattern entry; and
means for retrieving one or more further data items in dependence on the sector use prediction.

The present invention will be described further, by way of example only, with reference to embodiments thereof as illustrated in the accompanying drawings, in which:

FIG. 1 schematically illustrates a data processing system comprising a system cache in one embodiment;

FIG. 2 schematically illustrates a data processing apparatus in one embodiment, wherein a data processing apparatus is provided as a system-on-chip device and comprises a system cache;

FIG. 3 schematically illustrates in more detail the configuration of a system cache in one embodiment;

FIG. 4 schematically illustrates the storage, use, and updating, of sector use patterns using sector use counters in one embodiment;

FIG. 5 schematically illustrates the provision and usage of separate sector use pattern tables corresponding to each system component identifier for which a system cache provides data caching in one embodiment;

Figure 1:
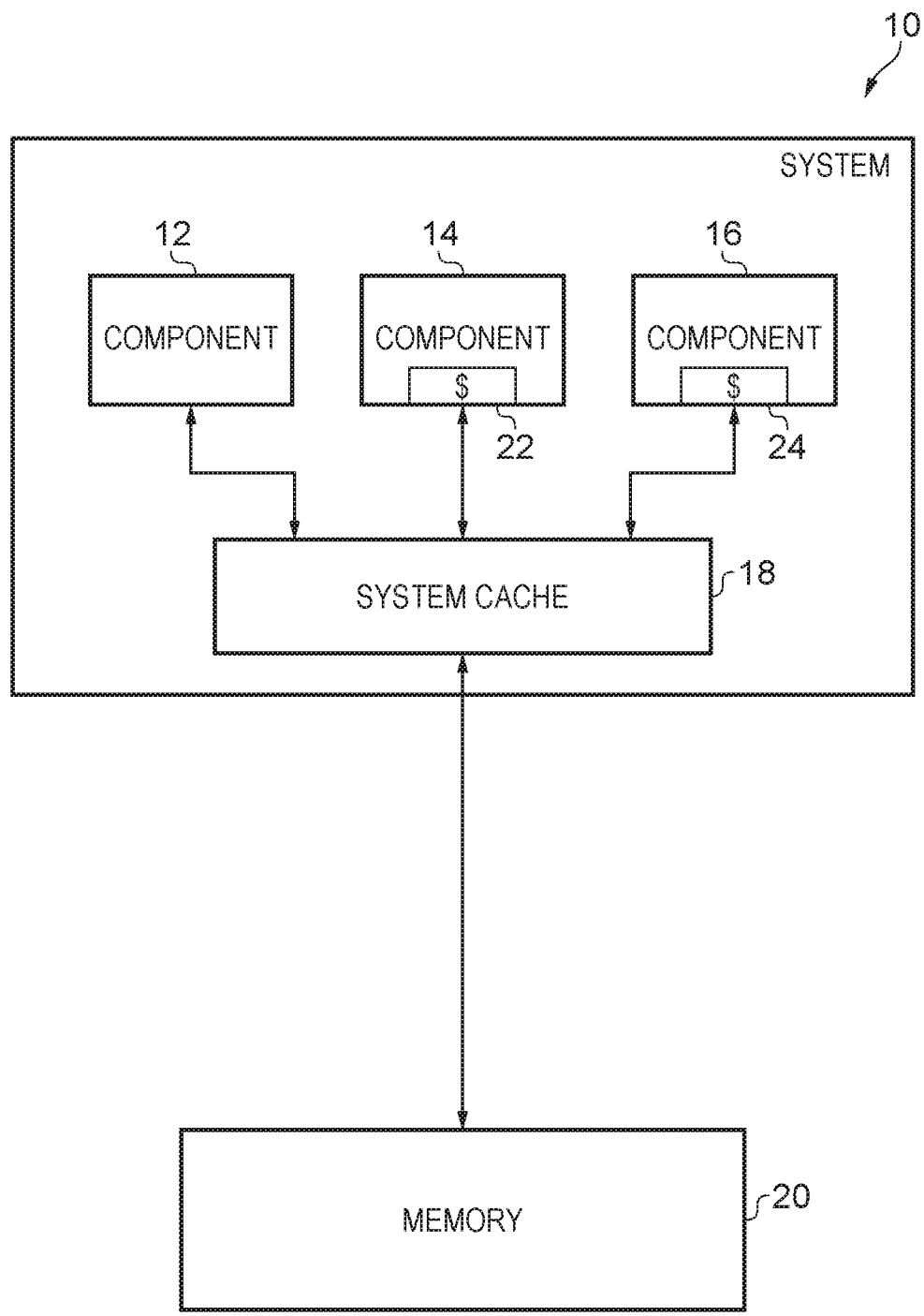

At least one example described herein provides a system cache to provide data caching in response to data access requests from plural system components, the system cache comprising: data caching storage having plural entries, each entry to store a block of data items and each block of data items comprising plural sectors of data items, and each block of data items being stored in an entry of the data caching storage with an associated address portion, sector use prediction circuitry having a set of pattern entries to store a set of sector use patterns and responsive to a data access request received from a system component specifying one or more data items to select a selected pattern entry in dependence on a system component identifier in the data access request, and to generate a sector use prediction in dependence on a sector use pattern in the selected pattern entry; and data retrieval circuitry to retrieve one or more further data items in dependence on the sector use prediction.

Each block of data items stored in the cache is subdivided into multiple sectors sharing an associated address portion (in some examples herein referred to as a tag portion). The system cache additionally stores a set of sector use patterns on the basis of which a sector use prediction can be generated. The set of sector use patterns may take a variety of forms, for example the sector use prediction may correspond in a one-to-one fashion to a given stored sector use pattern, or the sector use prediction may be derived from a sector use pattern. It is to be noted that the sector use pattern which is selected in order to generate the sector use prediction is selected in dependence on a system component identifier in the received data access request. This dependency of the selected pattern entry on the system component identifier (noting that this system cache is provided in order to provide data caching capability for multiple system components) is based on the novel recognition that particular system components may have specific, repeating patterns of access to the multiple sectors of blocks of data items cached in the system cache. Moreover, the data retrieval circuitry of the system cache is capable of retrieving further data items, which are not specified in a data access request, but are indicated by the sector use prediction. In other words these may be referred to as "non-requested data items". Hence, for example, when a block of data items is allocated into the data caching storage, more sectors of data items than those specified in the data access request which has triggered the allocation can be "prefetched" based on the sector use prediction, which may reduce or even eliminate future misses to the same block. Conversely, instead of the additional retrieval of further ("non-requested") data items, the sector use prediction may also be used in order to determine that allocation of an entry in the data caching storage for a new block of data items would not be worthwhile, since the sector use prediction indicates that usage of that block of data items would be too "sparse" (for example only using one sector in the block of data items or less than a given threshold number of sectors), and in response caching of the block of data items can be avoided, effectively bypassing this system cache completely, and filling only in a higher level cache closer to the requesting system component.

There are a number of ways in which the system cache may be configured to respond to the situation in which the data caching storage currently does or does not have an entry corresponding (by virtue of a matching address portion) to a data access request. In other words, there are a number of ways in which the system cache may respond to a cache hit or a cache miss. For example, where the data caching storage does not currently have an entry with a corresponding address portion (e.g. a matching tag), i.e. there is a cache miss, an entry in the data caching storage may be selected for storage of the corresponding requested data item (i.e. an allocation is carried out), and in dependence on the sector use prediction generated by the sector use prediction circuitry additional non-requested data items may be retrieved as a part of the data filling process for that newly allocated entry. Accordingly, in some embodiments the data retrieval circuitry is responsive to a miss signal from the data caching storage to cause the data caching storage to allocate an entry with an address portion taken from the data access request and to initiate a data filling process for the entry comprising retrieving the one or more data items specified in the data access request and additionally retrieving the one or more further data items indicated by the sector use prediction.

In some embodiments the data retrieval circuitry may be configured so that it dissociates the retrieval of data items specified in the data access request from the further retrieval of further (non-requested) data items which are not specified in the data access request but are nevertheless indicated by the sector use prediction. For example, the retrieval of the non-requested data items may take place subsequent to the retrieval of the specified data items and moreover only, say, when a bandwidth criterion is satisfied. For example, after fulfilling the data filling process to retrieve only the specified data item(s) in the data access request, it may then be determined if the level of activity on the path to memory is currently sufficiently low to allow an additional request to be made and where this is the case the data retrieval circuitry may then initiate a further data filling process in order to retrieve those further non-requested data items. The further predicted, but not-yet-requested, data items can thereby be brought into the cache at a moment when the memory system has the capacity to do so, without for example causing the peak requested bandwidth exceed a predefined limit.

Accordingly, in some embodiments the data retrieval circuitry is responsive to a miss signal from the data caching storage to cause the data caching storage to allocate an entry with an address portion taken from the data access request and to initiate a data filling process for the entry comprising retrieving the one or more data items specified in the data access request and subsequently, when a memory access bandwidth criterion is satisfied, initiating a further data filling process for the entry to retrieve the one or more further data items indicated by the sector use prediction.

In other situations it may be found that a matching entry is already stored in the cache, i.e. where the address portion of the data access request matches an entry in the cache, also referred to as a cache hit. In this situation the present techniques recognise that circumstances may nevertheless arise in which further data items which are not specified in the data access request but are indicated by the sector use prediction are not validly stored in the cache. In other words, a received data access request may result in a cache hit (specifically, a cache hit for the entry and a sector hit for the sector holding the requested data), but there may nonetheless be one or more "other" sectors of the matching cache block which resulted in the cache hit which do not contain valid data, but where the sector use prediction suggests that these latter sectors are expected to be used, and thus data for these sectors can be caused to be retrieved. Accordingly, in some embodiments the data retrieval circuitry is responsive to a hit signal from the data caching storage, and to sector validity information indicating that the one or more further data items indicated by the sector use prediction are not currently stored in the data caching storage, to initiate a data filling process for the entry comprising retrieving the one or more further data items.

Also in this situation, analogously to the discussion above, the retrieval of the further data items may be held back pending a determination that the level of activity on the path to memory is currently sufficiently low to allow an additional request to be made. As before the further predicted, but not-yet-requested, data items can thereby be brought into the cache at a moment when the memory system has the capacity to do so, without for example causing the peak requested bandwidth exceed a predefined limit. Accordingly, in some embodiments, the data retrieval circuitry is responsive to a hit signal from the data caching storage currently, and to sector validity information indicating that the one or more further data items indicated by the sector use prediction are not currently stored in the data caching storage, and when a memory access bandwidth criterion is satisfied, to initiate a data filling process for the entry comprising retrieving the one or more further data items.

The sector use prediction circuitry may take a variety of forms and correspondingly the set of sector use patterns which is stored may correspondingly take a variety of forms. However, in some embodiments the sector use prediction circuitry comprises sector use counters, and is responsive to the data access request received from the system component to select a subset of the sector use counters, wherein the sector use pattern is given by counter values of the subset of the sector use counters.

In such embodiments the sector use counters could take a variety of forms, for example being as simple as single bit counters each. Alternatively, the sector use counters may each be 2-bit, or more, depending on the particular system cache requirements. Where each counter of the sector use counters is only a single bit counter then the sector use prediction may in fact simply be a direct presentation of the counter values, indicating whether a corresponding sector is predicted to be used or not. Conversely, where the sector use counters are each at least 2-bit counters, a threshold value may be defined which must be exceeded by the count value held by each counter to indicate that the corresponding sector is predicted to be used. The sector use counters may each be at least 2-bit saturating counters. Accordingly, in some embodiments the sector use counters are each at least 2-bit saturating counters and the sector use prediction circuitry is responsive to a count value being above a threshold value to indicate in the sector use prediction that a sector to which that count value corresponds is predicted to be used.

The updating of the values held by each of the at least 2-bit counters may be provided in a variety of ways, but in some embodiments the sector use prediction circuitry is responsive to sector usage information, when the sector usage information indicates that the sector has been used, to increment said count value by an increment amount which is less than a decrement amount by which said count value is decremented when the sector usage information indicates that the sector has not been used. The sector usage information may be variously embodied, but for example may be a "usage" marker stored in association with each sector, which is set when that sector is the subject of a data access request. Accordingly, an asymmetric updating of the counters is provided, the decrement amount being greater than the increment amount. This technique may for example be employed where the updating of the sector use counters takes place after a period of usage, for example when the counters are updated when an eviction is carried out. This approach can be understood, assuming that the cache is generally caching useful data, in that unused sectors will be less common than used sectors.

In some embodiments the sector use pattern selected from the set of sector use patterns is selected in further dependence on address information specified in the data access request. Accordingly, the sector use pattern may not only have a dependence on the system component which generated the data access request but also on the specific address to which that data access request related. This allows further fine-tuning of the predicted sector use pattern for each system component on the basis of the address (range) accessed.

The sector use patterns may be stored in a variety of ways. For example, one set of storage entries may be used for the sector use patterns for all system component identifiers to which the system cache is configured to respond. It may for example be the case that different system components (where these different system components have a different system component identifiers) may share sector use patterns in the sector use prediction circuitry, where this is found to be beneficial, or at least not detrimental, to the system performance due to the respective sector access patterns of each system component. Alternatively, it may be the case that the set of sector use patterns stored in the sector use prediction circuitry and the mechanism by which the selected pattern entry is selected in dependence on the system component identifier is such that there is no overlap in the usage of sector use patterns between distinct system component identifiers. As such, in some embodiments the set of sector use patterns comprises an independent set of sector use patterns for each system component identifier of a set of system component identifiers to which the system cache is arranged to respond.

As mentioned above, the updating of the sector use patterns stored in the data caching storage may take a variety of forms, but in some embodiments the data caching storage further comprises sector usage storage associated with each sector of each block to indicate whether valid data has been accessed in each sector since the corresponding sector was populated with valid data and marked as valid, wherein each entry in the data caching storage further stores a pattern entry identifier, and wherein the sector use prediction circuitry is responsive to a block eviction from the data caching storage to update the sector use pattern in a pattern entry identified by the pattern entry identifier of the block being evicted in dependence on whether the content of the sector usage storage corresponding to the block being evicted indicates accessed data.

Accordingly, once a block of data items is evicted from the cache, the sector usage storage information can be used to determine which sectors of that block have in fact been used whilst that block was stored in the cache. The provision of the pattern entry identifier then enables the cache to find the matching entry in the set of pattern entries stored by the sector use prediction circuitry and then update that pattern in dependence on the observed sector usage of that block. The pattern entry identifier could in fact be the system component identifier where this is sufficient to uniquely identify the selected pattern entry; it could instead be the generated index into the set of pattern entries; and it could additionally comprise further information (e.g. related to the corresponding address). It may be stored in a format specific to the cache, or could be information taken directly from the received data access request, for example a bus identifier (such as when the bus is an ARM AXI bus, an AXI bus identifier).

It will be recognised that where a new entry in the data caching storage needs to be allocated in response to a data access request for which data is not currently stored in the cache that a victim entry must be selected and the content thereof written back (when dirty) to memory. This victim block selection may take place according to known victim selection techniques, but the present disclosure further contemplates that this could take place in dependence on the recorded usage of the sectors of one or more candidates for eviction. For example, a less used block could be selected to be the victim in preference to a more used block. Moreover, the present disclosure still further contemplates that a sector use prediction for the new entry can be generated and compared with the usage of a candidate victim block, and for example the eviction of a block from the cache could only be allowed if the sector use prediction for the new entry is an improvement on the usage of the candidate victim block, i.e. the new entry is expected to be more fully used than the block being evicted. Accordingly, in some embodiments the system cache further comprises victim block selection circuitry to select the block being evicted in dependence on a comparison of content of the sector usage storage associated with each sector of each block.

Tracking the validity and usage of sectors of a block may be provided in a variety of ways but in some embodiments there is at least 2-bit storage provided in association with each sector of each block. Indeed, the present techniques recognise that where portions of data stored in a cache may previously have been provided with "valid" and "dirty" bits to track the status of cached data content, and where in that old context there were only three meaningful statuses, i.e. "invalid", "valid and clean", and "valid and dirty", these bits may be repurposed to encode four different meaningful statuses of data items in a sector, indicating whether a) the sector is not valid, b) the sector is valid, clean and not yet accessed, c) the block is valid, clean and has been accessed, or d) the block is valid, dirty and has been accessed. This set of information stored for each sector then means that at eviction time it can be known (by combination with the sector use prediction for this block) whether each sector has been: a) predicted as used and accessed, b) predicted as used and not accessed, or c) not predicted and not accessed. The predictions (encoded as the sector use patterns) can then be updated accordingly, for example, by means of adjusting the values of the corresponding counters where such are provided.

In some embodiments the sector use prediction circuitry is further responsive to the data access request to update the sector use pattern in the selected pattern entry. Accordingly, the sector use pattern may be amended for each data access request and not only on an eviction.

In some embodiments the system cache further comprises allocation suppression circuitry, and wherein the allocation suppression circuitry is responsive to the sector use prediction for the predicted data access request indicating a sector usage below a sector usage threshold to suppression allocation of an entry in the system cache for data requested in the data access request. For example, where it is found that only one or very few sectors within a block which could be cached are expected to be used, allocation of a block for the corresponding data access request may be suppressed in order to save this data caching capability for a block which will be more fully used.

At least one example described herein provides a data processing apparatus comprising: a system cache as described in any of the above examples, and wherein the plural system components comprise: a main processing unit to perform data processing tasks; and at least one specialized data processing unit to perform selected data processing tasks delegated by the main processing unit. A specialized data processing unit which performs selected data processing tasks delegated to it by a main processing unit may benefit from the present techniques by virtue of the specialized data processing tasks it carries out resulting in patterns in the data accesses which it makes corresponding to a predictable pattern of usage of sectors within blocks of cached data. The main processing unit could take a range of forms, such as a classic central processing unit (CPU), a graphics processing unit (GPU), and so on. The specialized data processing units to perform selected data processing tasks could take a wide variety of forms, and indeed in a contemporary data processing system many such specialized data processing units may be present. However to give just one example, the specialized data processing units could form part of a graphics processing unit (GPU) or even a general purpose GPU (GPGPU), with each unit forming one processing stage of such a GPU. The specialized nature of the processing carried out at each stage is recognised by the present techniques as potentially resulting in the above-discussed predictable cache sector access patterns.

Although in some embodiments each system component may be provided with its own unique system component identifier, in other embodiments at least one specialised data processing unit is allocated more than one system component identifier and can issue the data access request with a selected one of those selected system component identifiers depending on the type of data processing activities carried out. In some embodiments, different system components may use the same system component identifier, where it is recognised that the data accesses that each performs will have a similar access pattern to sectors within a block of data.

At least one example described herein provides a method of operating a system cache to provide data caching in response to data access requests from plural system components, the method comprising the steps of: storing blocks of data items in plural entries of data caching storage, each entry storing a block of data items and each block of data items comprising plural sectors of data items, and each block of data items being stored in an entry of the data caching storage with an associated address portion; storing sets of sector use patterns in a set of pattern entries and in response to a data access request received from a system component selecting a selected pattern entry in dependence on a system component identifier in the data access request, and generating a sector use prediction in dependence on the sector use pattern in the selected pattern entry; and retrieving non-requested data items which are not specified in the data access request but are indicated by the sector use prediction.

At least one example described herein provides a system cache to provide data caching in response to data access requests from plural system components, the system cache comprising: means for storing blocks of data items in plural entries of data caching storage, each entry storing a block of data items and each block of data items comprising plural sectors of data items, and each block of data items being stored in an entry of the data caching storage with an associated address portion; means for storing sets of sector use patterns in a set of pattern entries and in response to a data access request received from a system component selecting a selected pattern entry in dependence on a system component identifier in the data access request, and for generating a sector use prediction in dependence on the sector use pattern in the selected pattern entry; and means for retrieving non-requested data items which are not specified in the data access request but are indicated by the sector use prediction.

Some particular embodiments will now be described with reference to the figures.

FIG. 1 schematically illustrates a data processing system 10 in one embodiment. The system 10 comprises three system components 12, 14, and 16 which each share a system cache 18. The system 10 also has access to a memory 20. As can also be seen in FIG. 1 the system components 14 and 16 are provided with their own local caches 22 and 24 respectively, whilst system component 12 does not have its own local cache. Data access requests from each of the system components 12, 14, and 16 first encounter the system cache 18 before, being passed on to the memory 20 if the requested data is not already present in the system cache 18.

Figure 2:
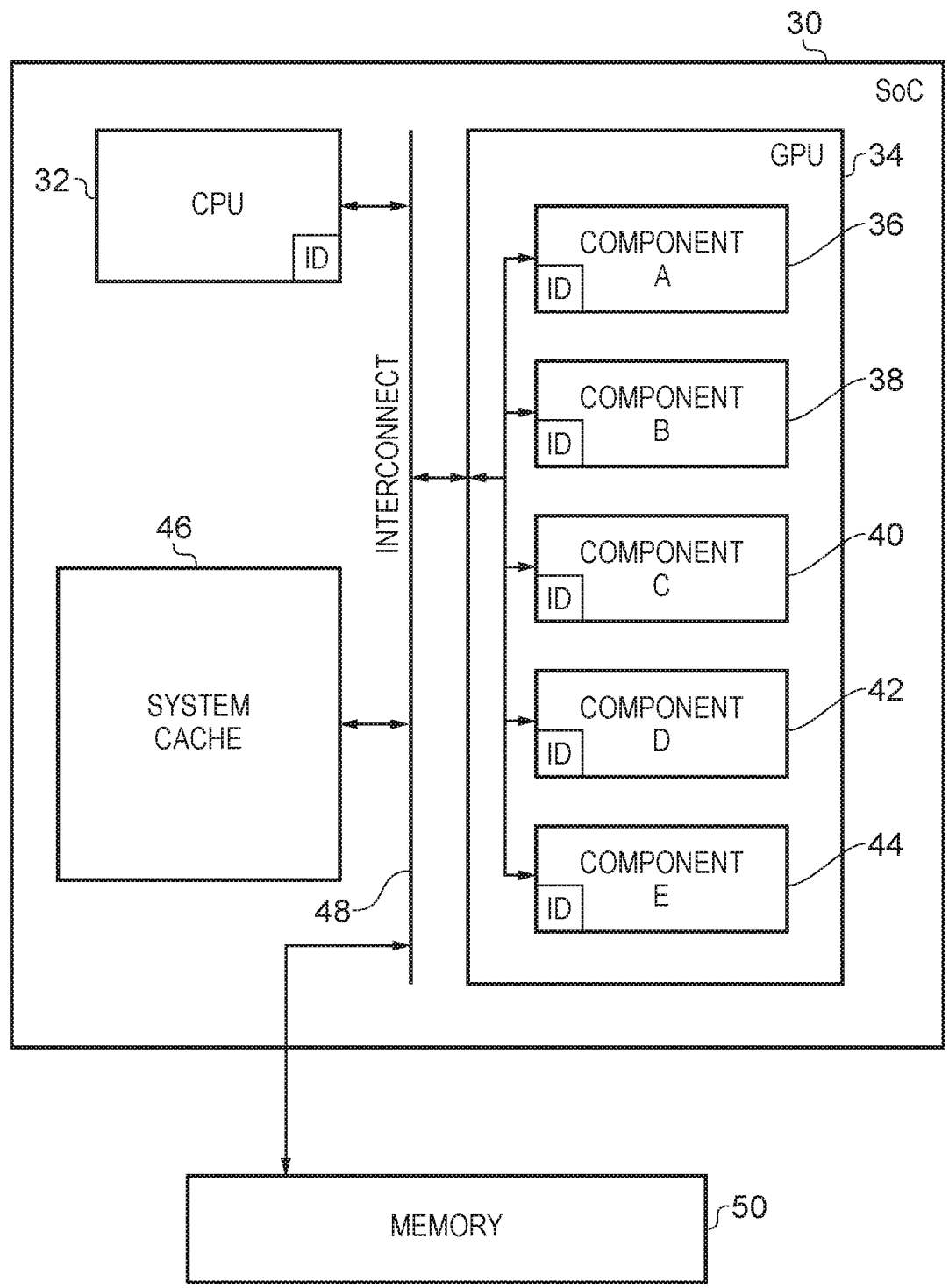

FIG. 2 schematically illustrates another example of a data processing system in an embodiment where the data processing system is embodied as a system-on-chip (SoC) 30. Generally, two main data processing parts are shown in the SoC 30, namely the CPU 32 and the GPU 34. In a manner with which one of ordinary skill in the art will be familiar the CPU 32 is in overall control of the data processing operations of the data processing system and delegates particular data processing tasks to the GPU 34. The GPU 34 may be variously configured, but for the purpose of illustration of the present techniques is shown in FIG. 2 to comprise a number of processing components A-E 36, 38, 40, 42, and 44. These may in this example be considered to form a graphics processing pipeline, and could provide (amongst others) the processing stages of: vertex processing 36, rasterization 38, shading 40, depth testing 42, and alpha blending 44, though this is just one exemplary distribution of an example set of the graphics processing tasks. One of ordinary skill in the art will be familiar with the types of processing which such graphics processing pipeline stages may perform, and indeed the detail of such processing is not relevant to the present disclosure and further detail is not described herein. The CPU 32 and each of the illustrated processing components of the GPU 34 are considered in the present context to be system components and as such each is allocated a system component identifier (ID) as shown in FIG. 2. These system components share access to the system cache 46 via the system interconnect 48, the system cache 46 providing data caching for data accessed by each of these system components which is stored in the memory 50. To name just some specific examples, the interconnect may for example conform to the AMBA/AXI interconnect/bus specifications as provided by ARM Limited, Cambridge, UK. As will be described in more detail with reference to the figures which follow, when a system component issues a data access request for one or more data items stored in the memory 50, this data access request is first handled by the system cache 46, and a system component identifier which forms part of the data access request is made use of by the system cache 46 to determine how that data access request is handled.

Figure 3:
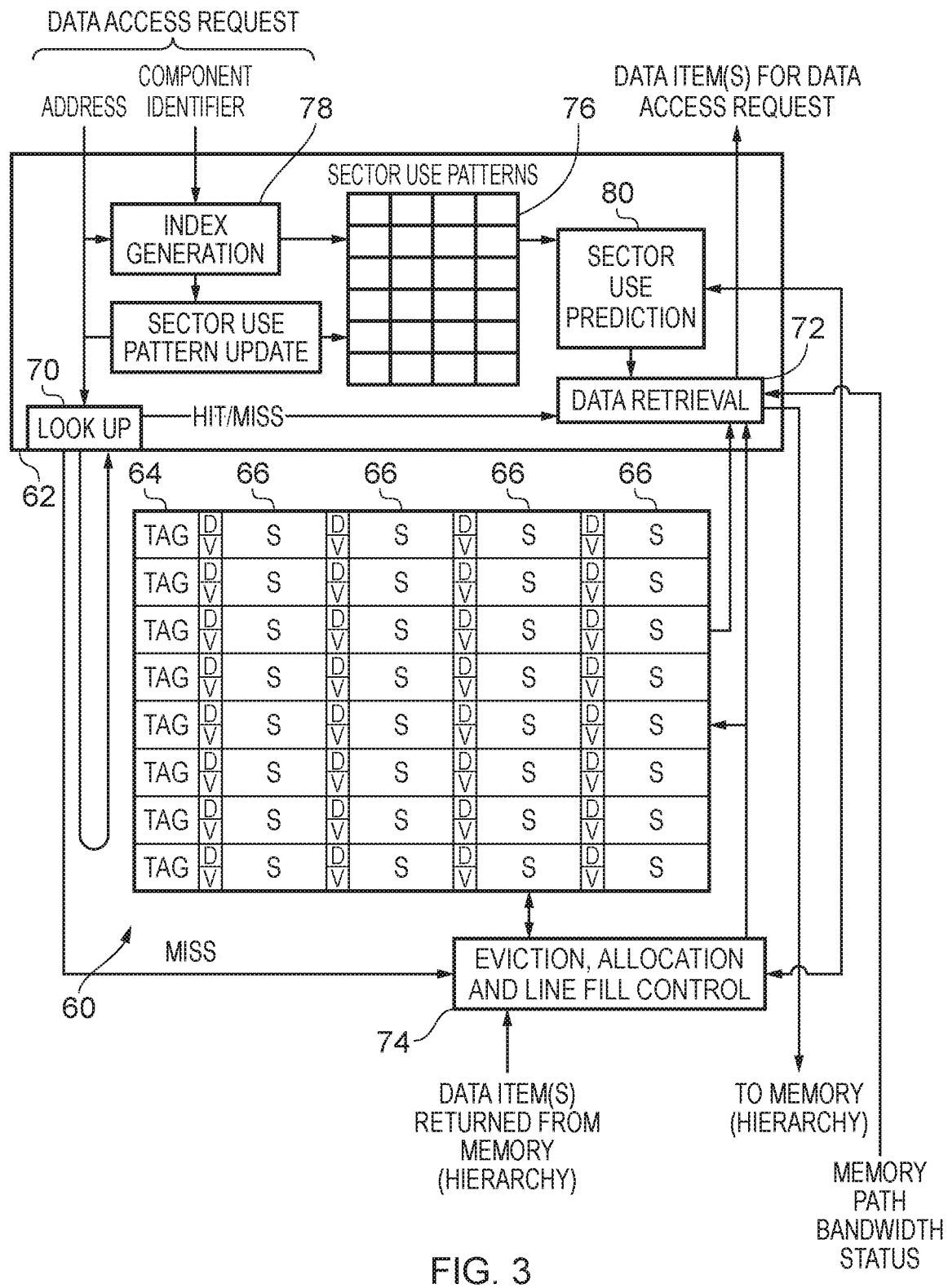

FIG. 3 schematically illustrates in more detail the configuration of a system cache in one embodiment, such as may be provided as the system cache 46 shown in FIG. 2. The system cache generally comprises a storage portion 60 and a control portion 62. The storage portion 60 is illustrated in FIG. 3 as having a set of eight entries (cache lines), although the restriction to this relatively limited number of entries is merely for the purpose of clarity of illustration and this storage portion may be provided with more entries than this. Indeed in a manner in which one of ordinary skill in the art will be familiar, the entries of the cache could also be provided in a set-associative manner, where addresses received by the cache index a set of entries. However, merely for the purpose of clarity of illustration, a directed mapped cache shown, i.e. a cache with only one block per set. Each entry comprises a tag portion 64 in which an address portion is stored in order to identify the corresponding block of data items. The block of data items (i.e. the cache line) is stored in the form of a number of sectors where FIG. 3 illustrates each block as comprising four sectors ("S") 66. Again, this number of sectors in each block is used here merely for the purposes of clarity of illustration and there could well be other number of sectors per block in another embodiment. Each sector 66 is additionally provided with two bits of storage, these being labelled "D" and "V" in FIG. 3. One of ordinary skill in the art will be familiar with this labelling referring to the "dirty" and "valid" status of the corresponding sector, yet the present techniques repurpose these information bits in a manner in which will be described in more detail below.

When a data access request is received by the system cache the memory address which forms part of the data access request is passed to the look up circuitry 70 of the control portion 62 in order for a cache look up to be performed to determine if a corresponding entry within the data storage portion 60 already exists. This look up procedure may result in a "hit" or a "miss" in a manner of which one of ordinary skill in the art will be familiar. This information is passed to the data retrieval circuitry 72 of the control portion 62. It should be noted that in addition to a match being found between the address forming part of the data access request and a corresponding tag portion 64 in the data storage section 60 being found, the corresponding sector in that entry (cache line) must also be found to contain valid data for the cache hit to be established. When such a cache hit is established the data retrieval circuitry 72 causes the corresponding requested data to be read out from the data caching storage 60 and the requested data item(s) are returned in response to the received data access request. Conversely, when a cache miss occurs the data retrieval circuitry 72 causes the data access request to be passed further either to a further intervening cache level or to the memory where the data item is stored, depending on the arrangement of the particular memory hierarchy in which this system cache is found. When a cache miss occurs, this signal is also passed to the eviction, allocation and line fill control circuitry 74. It should be noted that this circuitry 74 may also be provided as forming part of the control portion 62, but is only separated therefrom in FIG. 3 for clarity of illustration. In order to allow the requested data item(s) to be cached in the cache storage portion 60 when returned from the memory (hierarchy), the eviction, allocation and line fill control circuitry 74 selects an entry where the data item(s) will be stored and causes the current content thereof to be evicted. This process of allocation, eviction and the subsequent line filling will be familiar to one of ordinary skill in the art and is generally not described in further detail here. However, some aspects of the configuration of the eviction, allocation and line fill control circuitry 74 differ here, in particular in the use that may be made of the sector use prediction information, which is described in more detail below.

The cache control portion 62 also comprises storage for a set of sector use patterns 76 where each pattern comprises information relating to each sector in a data block (i.e. cache line). Accordingly, in the example shown in FIG. 3 the sector use patterns each comprise four portions, corresponding to the four sectors in each entry of the data caching storage 60, and where the number of sectors in each entry could vary as mentioned above, the number of parts of each sector use pattern would then also correspondingly vary to match. The sector use pattern storage 76 is shown in FIG. 3 as comprising six entries, and one of these entries is selected by means of the index generation circuitry 78, which also forms part of the control portion 62. The index generation circuitry 78 receives the address which forms part of the data access request as well as a component identifier also forming part of the data access request. On receipt of a data access request a selected sector use pattern is selected from the stored set 76 on the basis of the component identifier and the address, and this selected pattern is passed to the sector use prediction circuitry 80 which generates a sector use prediction, also referred to herein as a "footprint", for the corresponding entry in the data caching storage. In the example of FIG. 3, this information is shown being passed to the data retrieval circuitry 72. There are various ways in which the data retrieval circuitry 72 can make use of this information, partly in dependence on the hit or miss signal received from the look up circuitry 70. It may also use this information in combination with further information received about the current status of the memory path bandwidth, i.e. how busy the memory path is currently.

For example, where a cache miss is established, the data retrieval circuitry 72 can augment the data access request which is passed further to memory by additionally requesting data for other sectors in the entry to which the data access request corresponds, but which do not form part of the data access request itself. For example, where the sector use pattern indicates that the usage of a given data entry is expected to be of the first two sectors of that entry, but where a data access request has been received only for one of those sectors, the data retrieval circuitry 72 can include the other of those first two sectors in the forwarded data access request, to cause both sectors to be populated with valid data returned from the memory in the expectation that both sectors will be used during the lifetime of this cache line (i.e. before it is evicted). However the data retrieval circuitry 72 may also delay requesting the data for the additional non-requested sectors if current bandwidth demand is already high, for example waiting until the current status of the memory path bandwidth is sufficiently quiet so that "prefetching" this additional data will not overburden the memory access path.

Alternatively where a cache hit is established, it is recognised here that, because of the individual validity labelling of the sectors of each block, some sectors within a cache hit block may nonetheless miss, i.e. be labelled as invalid. Were this to occur for a requested data item (for example because a rare, and thus unpredicted, data access to a particular sector is made), then the data access request will be forwarded to the memory. If further sectors of the cache line are predicted and also marked as invalid, then the data retrieval circuitry 72 can also include those sectors in the forwarded data access request. As before, the data retrieval circuitry 72 may however delay requesting the data for the additional non-requested (but predicted) sectors if current bandwidth demand is already high, for example waiting until the current status of the memory path bandwidth is sufficiently quiet so that "prefetching" this additional data will not overburden the memory access path.

Additionally, other use of the sector usage predictions may also be made by the data retrieval circuitry, as will be discussed in more detail below.

Figure 4:
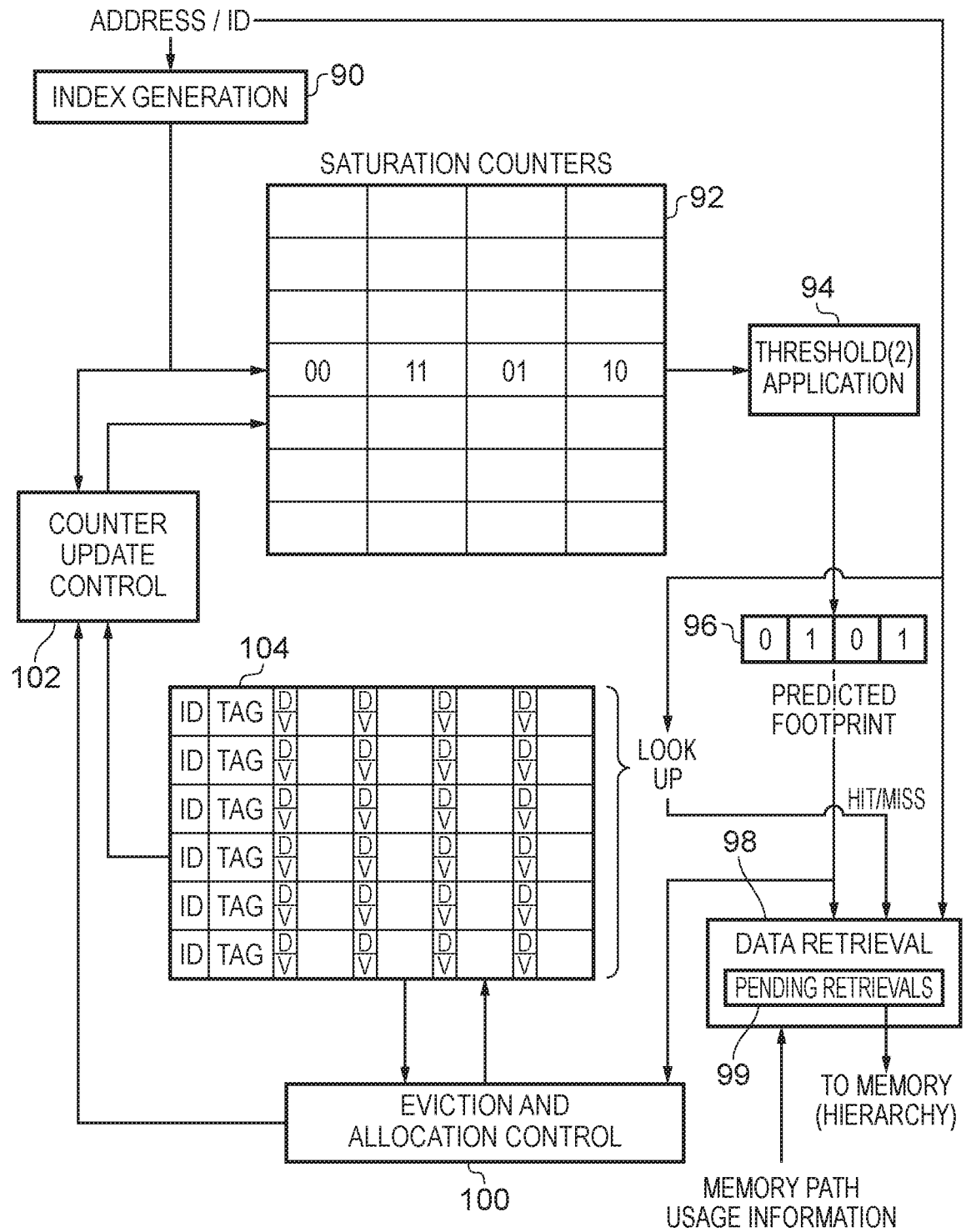

FIG. 4 schematically illustrates in more detail the configuration of the set of pattern entries taking the form of a set of saturation counters in one embodiment, as well as further related detail of further components of the system cache. The address and component ID which form part of the data access request are received by the index generation circuitry 90 which generates an index into the pattern entry storage, which as mentioned here is provided in the form of a set of saturation counters, one 2-bit counter being provided corresponding to each sector in a block of the cache storage. The corresponding entry from the saturation counters identified by the index generator by the index generation circuitry 90 is read out and passed to the threshold application circuitry 94, which applies a predefined threshold to generate a sector use predication ("predicted footprint") 96. In the example illustrated in FIG. 4 the threshold applied is whether a 2-bit counter holds a value of at least 2 (binary '10'), but this could be otherwise defined in other examples.

The sector use prediction is passed to the data retrieval circuitry 98 which causes a corresponding data access request to be passed further to the memory as required and as modified according to one of the variations discussed above relating to whether non-requested sectors are additionally requested, possibly delayed, and so on. If a data retrieval should be held back pending a memory bandwidth criterion being satisfied the retrieval request is held in the pending retrievals queue 99 of the data retrieval circuitry 98 until the criterion is met. The data retrieval circuitry 98 receives memory path usage information for this purpose. Note also that the data retrieval circuitry 98 as before receives the hit/miss information resulting from a look up and the address information itself. As shown in the figure the sector use prediction 96 is also passed to the eviction and allocation control circuitry 100, which makes use of this information to determine which entry should be evicted. When an eviction occurs the eviction and control circuitry 100 signals this to the counter update control circuitry 102, which also receives an indication of the corresponding component ID from the to-be evicted entry of the cache data storage 104 and the corresponding saturation counters 92 for the corresponding entry are updated on the basis of the usage information for the sectors of that entry in the data caching storage 104 (noting that a "used" entry will always be "valid"). Note also the repurposing of the "dirty" (D) and "valid" (V) bits to support this, where these two bits define four possible states for each sector, namely: 1) Invalid; 2) Clean and unused; 3) Clean and used; and 4) Dirty.

Figure 5:
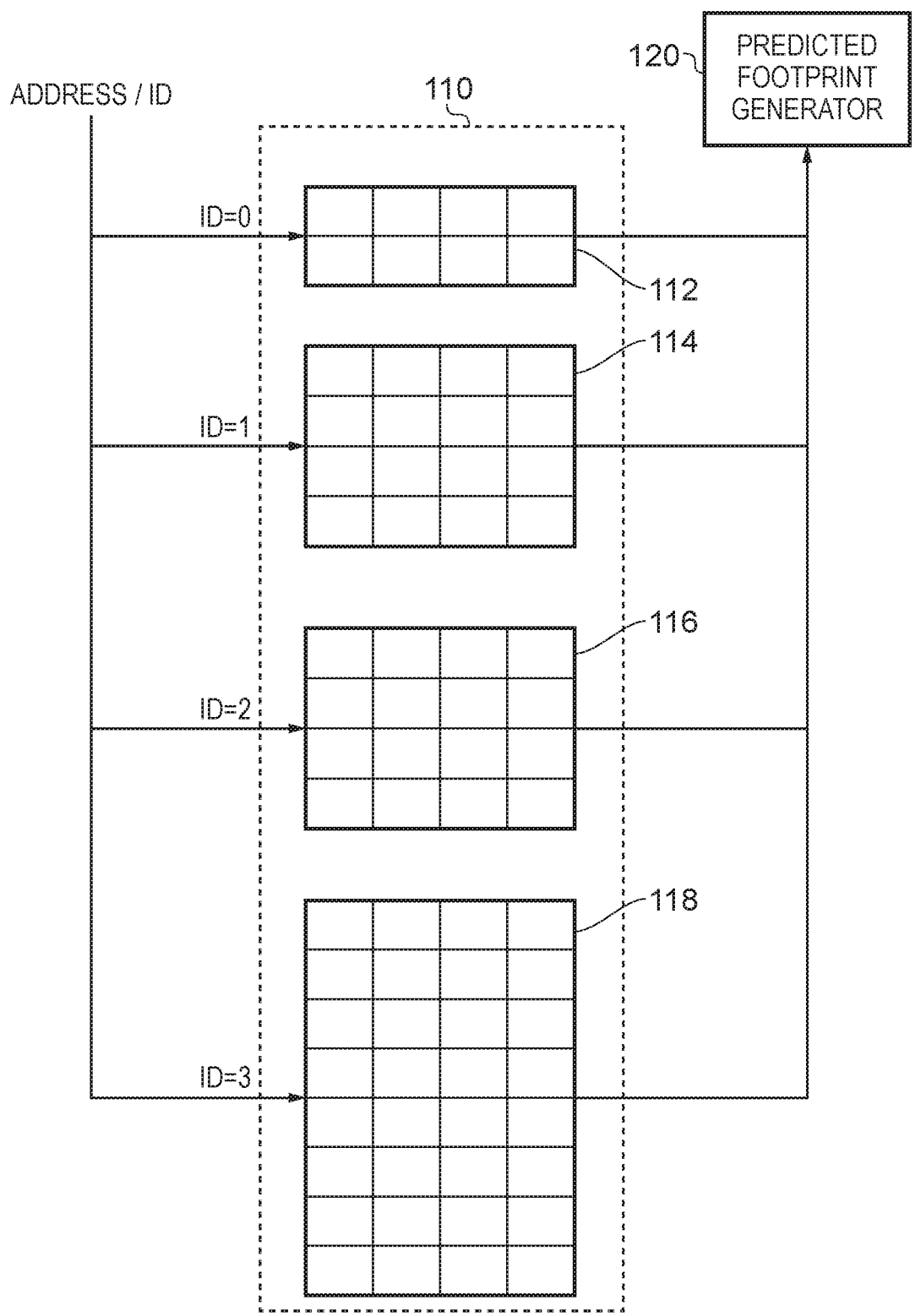

FIG. 5 schematically illustrates an example in which the stored sector use patterns (which may take the form of saturation counters as in the example of FIG. 4) 110 are embodied as four separate storage structures 112, 114, 116, and 118. It should be noted that this separation of the storage structures is essentially only logical and whilst these could be provided a physically separate structures they may also be provided as a single storage structure with a logical configuration only dividing the storage capacity into the illustrated arrangement. Most notably the arrangement of this structure is such that a received address and component identifier as part of data access request causes data access requests from four different system components (with respective component identifiers ID=0-3) each reference a different section of the combined structure 110 namely a selected portion chosen from the structures 112, 114, 116, and 118 respectively as shown. The sector use pattern (e.g. sector saturation counter values) selected from the respective table on the basis of the component identifier, and using the address information to select the specific pattern from within that structure, is passed to the predicted footprint generator 120, which generates the predicted footprint as described above on the basis of the sector use pattern, for example by application of a threshold to determine a binary predication of whether each of the respective sectors (4 in this example) are predicted to be used during the lifetime of the block in the cache. This arrangement of providing a separate storage structure corresponding to each component identifier enables the predicted footprint within the sector cache for each system component to be maintained individually and independently of other system components.

Figure 6:
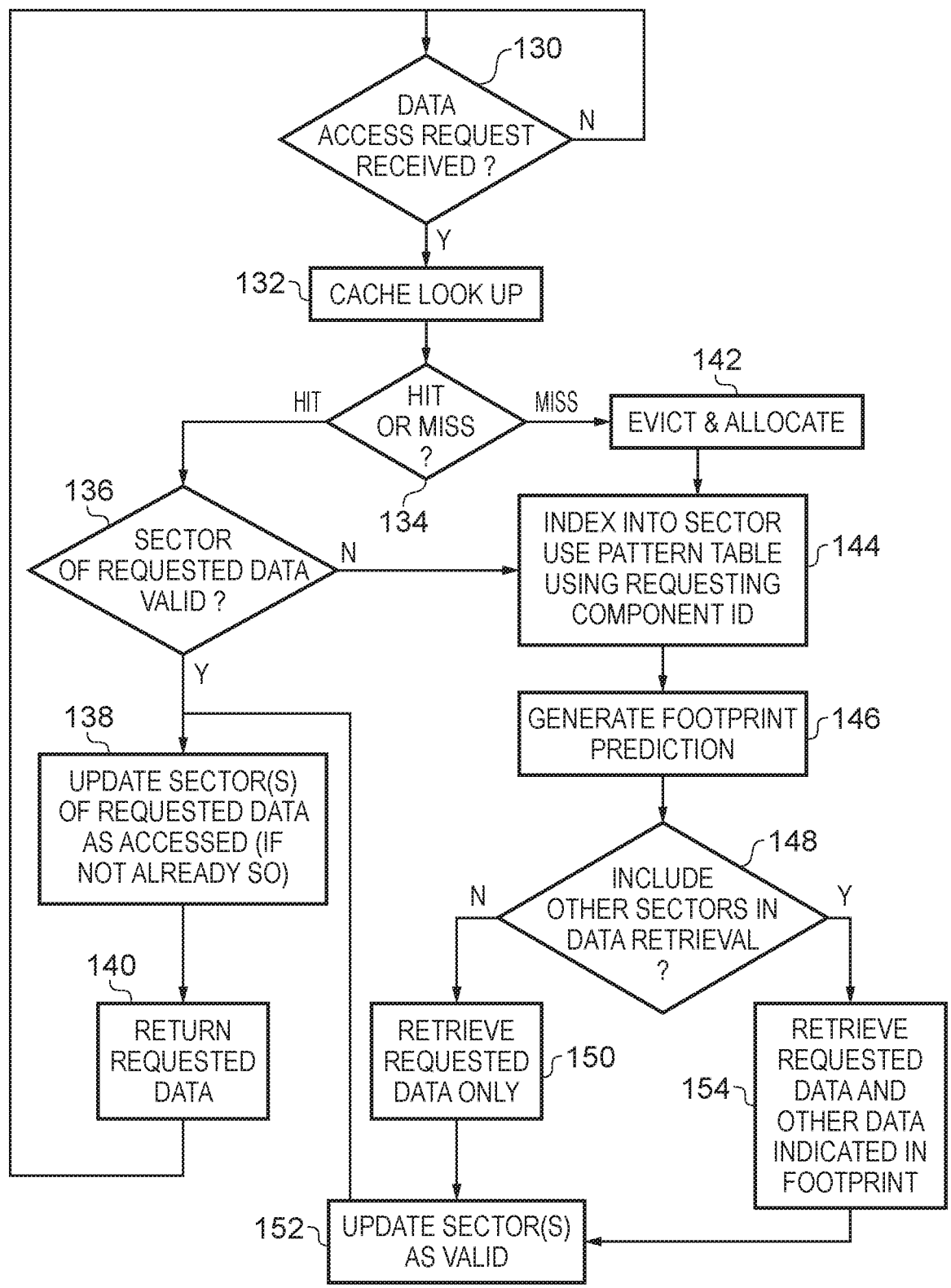
FIG. 6 shows a sequence of steps which are taken by a cache in one embodiment in response to a data access request from a system component.

FIG. 6 shows a sequence of steps which are carried out according to a method in one embodiment. The flow can be considered to begin at step 130 where a data access request is received by the system cache. When such a data access request is received, the flow proceeds to step 132 where a cache lookup is performed. It is then determined at step 134 whether a cache hit or a cache miss has resulted. In the event of a cache hit the flow proceeds to step 136 where it is determined if the sector within the corresponding cache line where the requested data should be found is marked as valid (i.e. whether there is also a "sector hit"). If the sector is also valid the flow proceeds to 138 where if not already marked as "used" (also referred to as "accessed") the sector or sectors corresponding to the requested data that has now been accessed is marked as accessed using the corresponding bit in the 2-bit status value for each sector (valid and accessed) and at step 140 the requested data is returned to the requesting system component and the flow returns to step 130.

Returning to a consideration of step 134 if it is determined there that a cache miss has occurred then the flow proceeds to step 142, where an eviction and allocation procedure begins. As mentioned above, the selection of a victim cache line can be performed on the basis of examination of the corresponding predicted footprint (see discussion above with reference to FIG. 4) to select a victim cache line. Further, apart from identifying a candidate block (cache line) for eviction that will, for example, be that which is expected to used the furthest in the future the eviction policy may make use of the footprint predictions available to enable a replacement decision to be made which also takes into account the density (subsector usage) difference of the evicted block (via the subsector usage information marked for this block in the cache line) and the fetched block (via the footprint prediction). For example, in one example a specific (high confidence) least-recently-used (LRU) prediction may be mandated, if a block should be evicted that has a high usage density and replaced by a block with a predicted low usage density. As a further example, in such an LRU cache either the least or the next least recently used line (say) could be chosen as the victim if either of those lined is sparser than the footprint prediction of the newly allocated block. With regard to the retrieval of requested data from memory the flow proceeds from step 142 to step 144, where the requesting component's identifier is used to index into the sector use pattern table. It is to be noted that this step is also reached from step 136 (see above) in the event that the sector of the requested data is not valid. A footprint prediction is then generated on the basis of the selected sector use pattern at step 146 and on the basis of this prediction at step 148 it is determined whether other sectors should simultaneously be included in the data retrieval. If not the flow proceeds to step 150 where only the requested data is retrieved after which the corresponding sector or sectors of that requested data are marked as valid in the cache line at step 152 and the flow continues via step 138 as described above to mark the requested data as having been accessed and so on. Conversely, if at step 148 it is determined that other sectors should be included in the data retrieval on the basis of the footprint prediction then the flow proceeds via step 154 where both requested data and other data indicated by the expected footprint are retrieved and the flow then proceeds to step 152, as described above.

Figure 7:
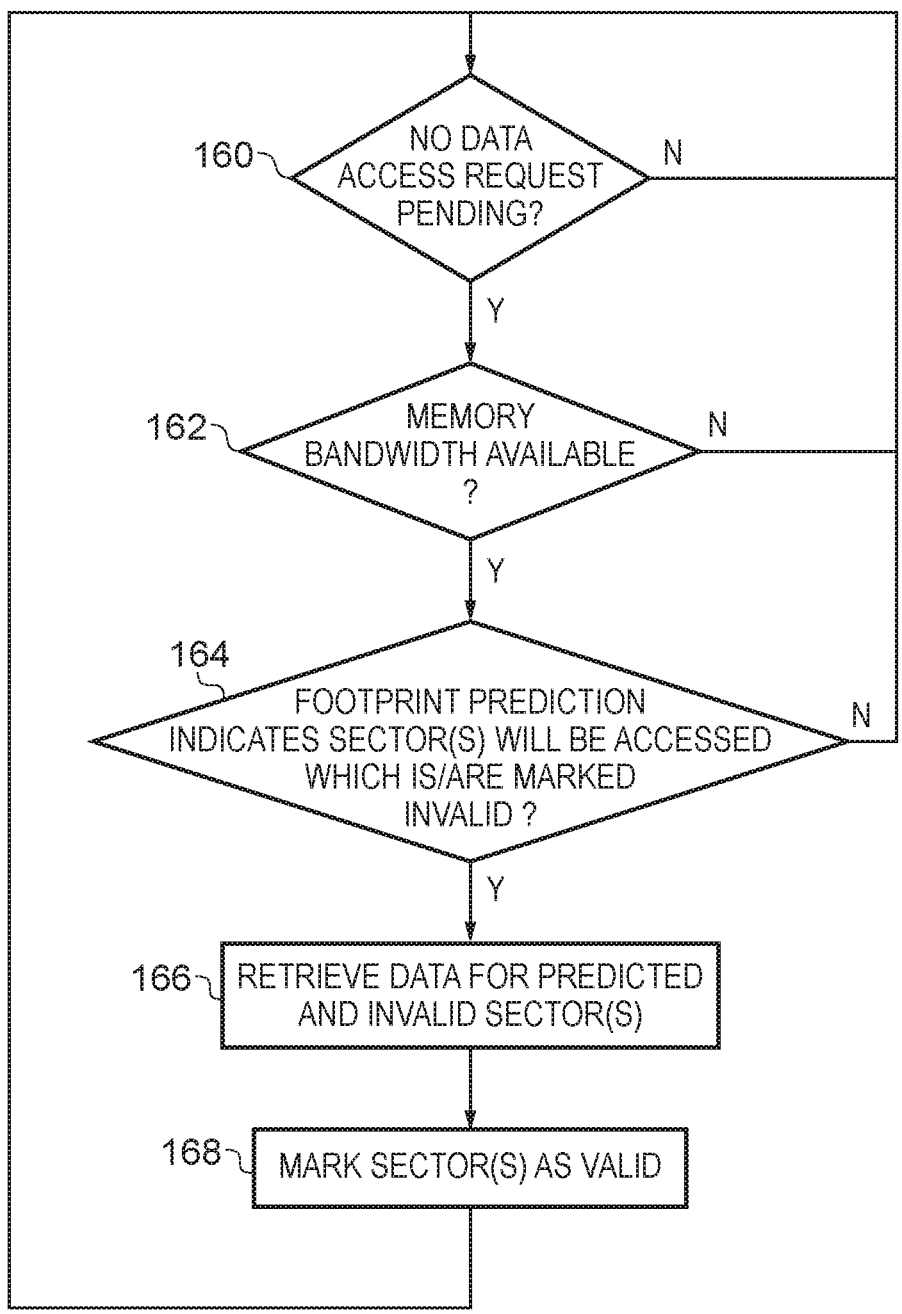
FIG. 7 shows a sequence of steps which are taken by a system cache in one embodiment when no data access request is currently pending.

FIG. 7 shows a sequence of steps which are taken by a system cache in some embodiments, which should be considered to be independent from the sequence of steps shown in FIG. 6, in the sense that these are generally independent processes. In particular, the steps shown in FIG. 7 relate to the situation when there is not a data access request pending for the system cache to be dealt with for example in the manner described with reference to FIG. 6. The flow can be considered to begin at step 160 where it is determined if there is currently no data access request pending. When this is the case the flow proceeds to step 162 where a determination is made whether there is currently memory bandwidth available for additional retrieval of data from memory into the system cache. For example, a memory bandwidth criterion can be set specifying that activity on the interconnect between the system cache and the memory must be below a specified level. When this is not the case the flow returns to step 160. However, when this criterion is satisfied the flow proceeds to step 164, where it is determined if the system cache has a generated footprint prediction which has indicated sectors in a cache line which will be accessed but which is or are currently marked as invalid. As a result of this determination, a data retrieval request may be have held as pending until this memory bandwidth criterion was satisfied (see for example the pending retrievals queue 99 of the data retrieval circuitry 98 shown in FIG. 4). For example, referring again to FIG. 6, at step 148 thereof the decision of whether to include other sectors in the data retrieval may have had a negative outcome on the basis that the memory bandwidth was not at that stage available to include other sectors in the data retrieval and thus the system cache can have buffered a pending further data access request to pass to memory for these other sectors, awaiting a drop off in the interconnect usage. Thus, at step 164 when such additional data should be retrieved the flow proceeds to step 166 where the system cache initiates one or more data access requests to pass to memory to retrieve data for predicted and currently invalid sectors of one or more cache lines. Otherwise the flow returns to step 160. When this data has been retrieved the corresponding sector or sectors are marked as valid at step 168 and the flow returns to step 160.

Figure 8:
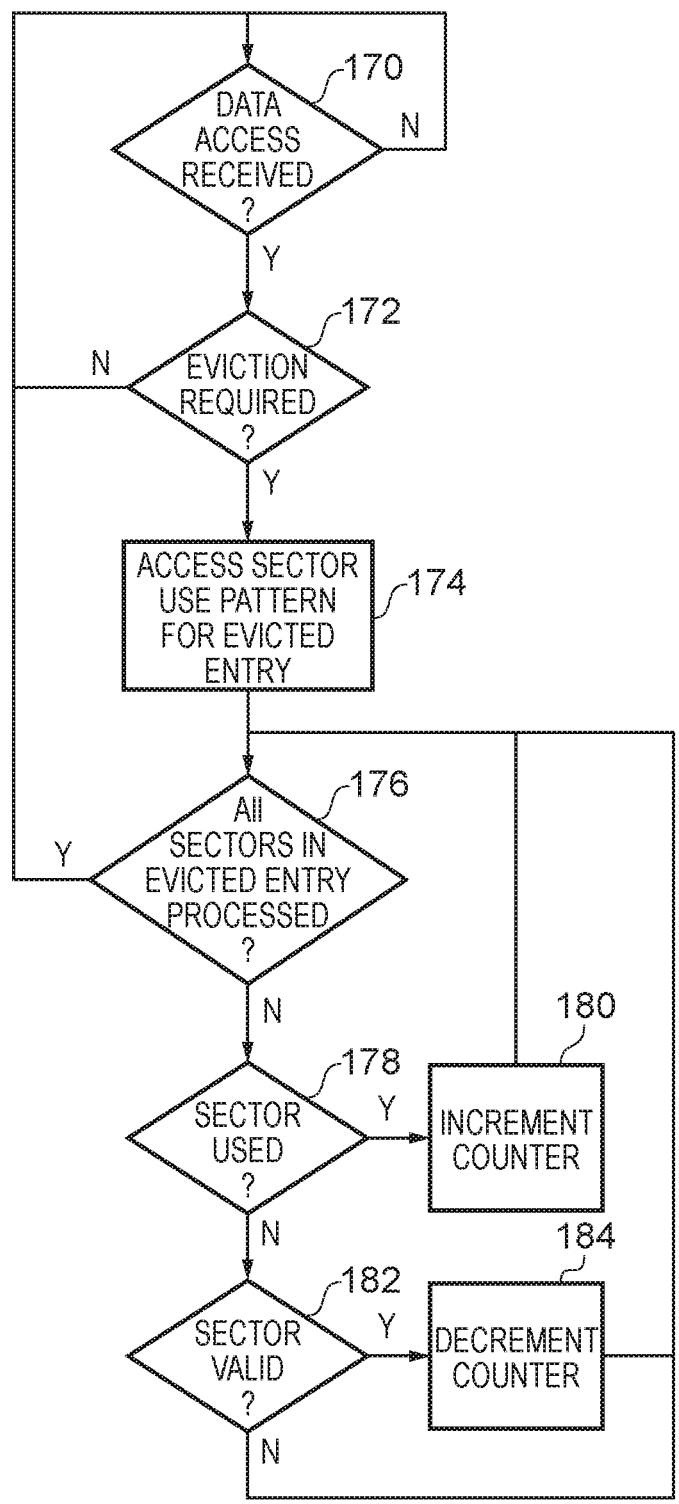
FIG. 8 shows a sequence of steps which are taken by a system cache in one embodiment in order to update the sector use patterns which it stores when an entry is evicted.

FIG. 8 shows a sequence of steps which should be considered to be independent and parallel to the steps described with reference to FIG. 6 and to FIG. 7. These steps relate to the manner in which the sector use patterns stored in the sector cache, and on the basis of which sector usage predictions (predicted footprints) are generated, are updated in one embodiment. In this embodiment this updating occurs when an entry is evicted from the cache. The flow can be considered to begin at step 170 where it is determined if a data access request has been received. When this is the case the flow proceeds to step 172 where it is determined if an eviction is required. When this is the case the flow proceeds to step 174 where the corresponding sector use pattern identified on the basis of the address and component identifier is indexed into and then the respective sectors of the evicted block are considered in turn. Hence at step 176 it is determined if all sectors in the evicted entry have been processed. Clearly at the first iteration this will not be true and the flow proceeds to step 178. Steps 178, 180, 182 and 184 together provide that where a sector is found to be used (as marked in association with the stored sector in the cache) the corresponding counter (sector use pattern) is incremented, whereas if a sector is found to be valid, but unused, the corresponding counter (sector use pattern) is decremented. The flow returns to step 176 until all sectors of the evicted block are processed. It will be appreciated that there is no need for the sectors to be processed in a sequential manner as the flow diagram describes, and this is only set out in this manner here merely to facilitate a step-by-step description. Once all counters that need updating have been updated the flow returns to step 170.

Figure 9:
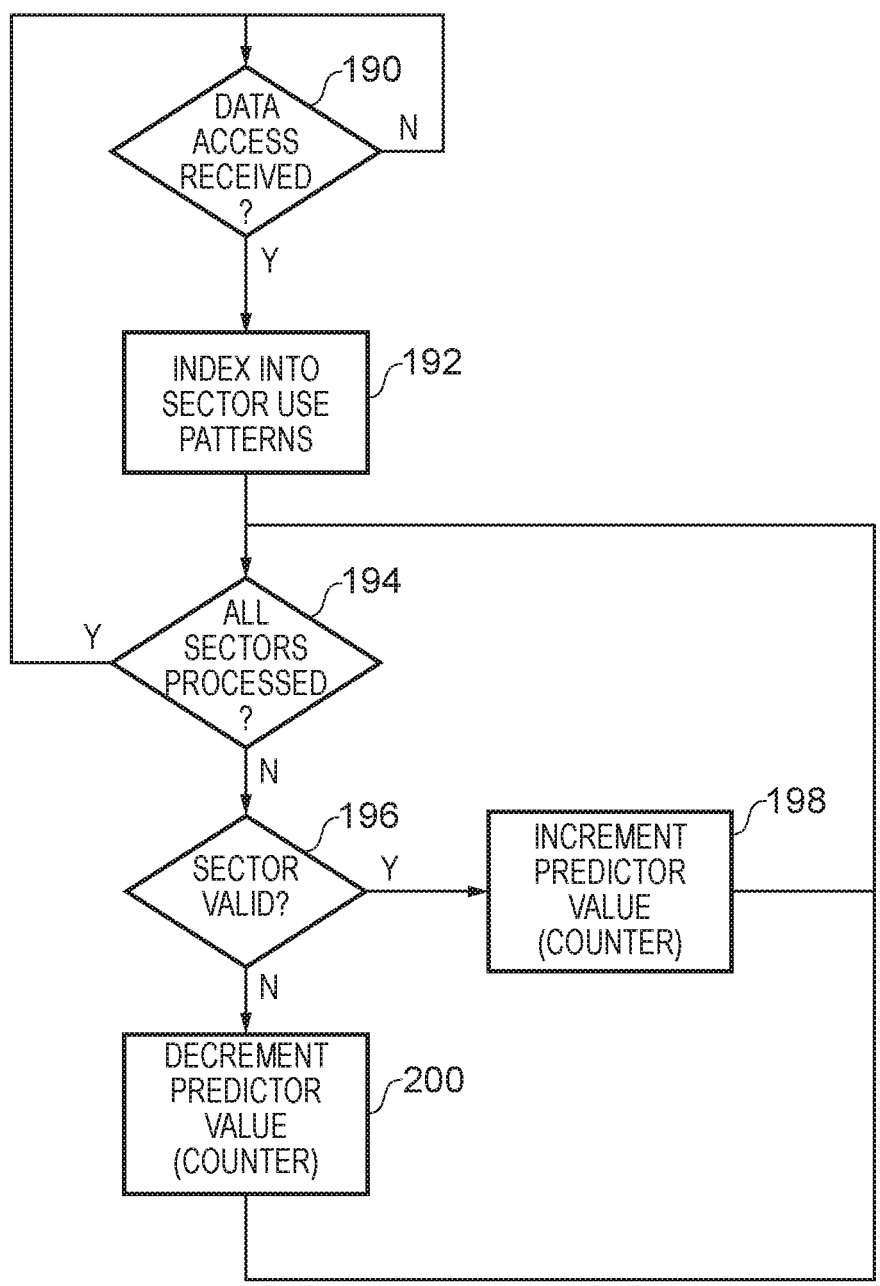
FIG. 9 shows a sequence of steps which are taken by a system cache in one embodiment in order to update the sector use patterns which it stores when the cache is accessed.

FIG. 9 shows an alternative embodiment to that of FIG. 8. These steps also relate to the manner in which the sector use patterns stored in the sector cache, and on the basis of which sector usage predictions (predicted footprints) are generated, are updated in one embodiment. In this embodiment this updating occurs on each access to the cache. The flow can be considered to begin at step 190 where it is determined if a data access request has been received. When this is the case the flow proceeds to step 192 where the corresponding sector use pattern identified on the basis of the address and component identifier is indexed into and then the respective sectors of the cache block accessed for this access are considered in turn. Hence at step 194 it is determined if all sectors in the block have been processed. Clearly at the first iteration this will not be true and the flow proceeds to step 196. Steps 196, 198 and 200 together provide that valid sectors cause the corresponding counter (sector use pattern) to be incremented, whereas invalid sectors cause the corresponding counter (sector use pattern) to be decremented. The flow returns to step 194 until all sectors of the block have been processed. As above, it will be appreciated that there is no need for the sectors to be processed in a sequential manner as the flow diagram describes, and this is only set out in this manner here merely to facilitate a step-by-step description. Once all counters that need updating have been updated the flow returns to step 190.

In brief overall summary a system cache and method of operating a system cache are provided. The system cache provides data caching in response to data access requests from plural system components. The system cache has data caching storage with plural entries, each entry storing a block of data items and each block of data items comprising plural sectors of data items, and each block of data items being stored in an entry of the data caching storage with an associated address portion. Sector use prediction circuitry is provided which has a set of pattern entries to store a set of sector use patterns. In response to a data access request received from a system component specifying one or more data items a selected pattern entry is selected in dependence on a system component identifier in the data access request and a sector use prediction is generated in dependence on a sector use pattern in the selected pattern entry. Further data items may then be retrieved which are not specified in the data access request but are indicated by the sector use prediction, and memory bandwidth usage is thereby improved.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A system cache to provide data caching in response to data access requests from plural system components, the system cache comprising:
data caching storage having plural entries, each entry to store a block of data items and each block of data items comprising plural sectors of data items, and each block of data items being stored in an entry of the data caching storage with an associated address portion,
sector use prediction circuitry having a set of pattern entries to store a set of sector use patterns and, responsive to a data access request received from a system component specifying one or more data items, to select a selected pattern entry in dependence on a system component identifier in the data access request, and to generate a sector use prediction in dependence on a sector use pattern in the selected pattern entry; and
data retrieval circuitry to retrieve one or more further data items in dependence on the sector use prediction,
wherein the sector use prediction circuitry comprises sector use counters, and is responsive to the data access request received from the system component, in order to select a subset of the sector use counters, wherein the sector use pattern is given by counter values of the subset of the sector use counters,
wherein the data retrieval circuitry is responsive to a hit signal from the data caching storage indicating a cache hit and a sector hit, and to sector validity information indicating that the one or more further data items indicated by the sector use prediction are not currently stored in the data caching storage, to initiate a data filling process for the entry comprising retrieving the one or more further data items.

2. The system cache as claimed in claim 1, wherein the data retrieval circuitry is responsive to a miss signal from the data caching storage to cause the data caching storage to allocate an entry with an address portion taken from the data access request and to initiate a data filling process for the entry comprising retrieving the one or more data items specified in the data access request and additionally retrieving the one or more further data items indicated by the sector use prediction.

3. The system cache as claimed in claim 1, wherein the data retrieval circuitry is responsive to a miss signal from the data caching storage to cause the data caching storage to allocate an entry with an address portion taken from the data access request and to initiate a data filling process for the entry comprising retrieving the one or more data items specified in the data access request and subsequently, when a memory access bandwidth criterion is satisfied, initiating a further data filling process for the entry to retrieve the one or more further data items indicated by the sector use prediction.

4. The system cache as claimed in claim 1, wherein the data retrieval circuitry is responsive to a hit signal from the data caching storage currently, and to sector validity information indicating that the one or more further data items indicated by the sector use prediction are not currently stored in the data caching storage, and when a memory access bandwidth criterion is satisfied, to initiate a data filling process for the entry comprising retrieving the one or more further data items.

5. The system cache as claimed in claim 1, wherein the sector use counters are each at least 2-bit saturating counters and the sector use prediction circuitry is responsive to a count value being above a threshold value to indicate in the sector use prediction that a sector to which that count value corresponds is predicted to be used.

6. The system cache as claimed in claim 5, wherein the sector use prediction circuitry is responsive to sector usage information, when the sector usage information indicates that the sector has been used, to increment said count value by an increment amount which is less than a decrement amount by which said count value is decremented when the sector usage information indicates that the sector has not been used.

7. The system cache as claimed in claim 1, wherein the sector use pattern selected from the set of sector use patterns is selected in further dependence on address information specified in the data access request.

8. The system cache as claimed in claim 1, wherein the set of sector use patterns comprises an independent set of sector use patterns for each system component identifier of a set of system component identifiers to which the system cache is arranged to respond.

9. The system cache as claimed in claim 1,
wherein the data caching storage further comprises sector usage storage associated with each sector of each block to indicate whether valid data has been accessed in each sector since the corresponding sector was populated with valid data and marked as valid,
wherein each entry in the data caching storage further stores a pattern entry identifier, and
wherein the sector use prediction circuitry is responsive to a block eviction from the data caching storage to update the sector use pattern in a pattern entry identified by the pattern entry identifier of the block being evicted in dependence on whether the content of the sector usage storage corresponding to the block being evicted indicates accessed data.

10. The system cache as claimed in claim 9, further comprising victim block selection circuitry to select the block being evicted in dependence on a comparison of content of the sector usage storage associated with each sector of each block.

11. The system cache as claimed in claim 9, wherein the sector validity usage storage associated with each sector of each block comprises at least 2-bit storage.

12. The system cache as claimed in claim 1, wherein the sector use prediction circuitry is further responsive to the data access request to update the sector use pattern in the selected pattern entry.

13. The system cache as claimed in claim 1, further comprising allocation suppression circuitry, and wherein the allocation suppression circuitry is responsive to the sector use prediction for the predicted data access request indicating a sector usage below a sector usage threshold to suppression allocation of an entry in the system cache for data requested in the data access request.

14. A data processing apparatus comprising:
a system cache as claimed in claim 1, and wherein the plural system components comprise:
a main processing unit to perform data processing tasks; and
at least one specialized data processing unit to perform selected data processing tasks delegated by the main processing unit.

15. The data processing apparatus as claimed in claim 14, wherein at least specialized data processing unit is allocated more than one system component identifier and is capable of issuing the data access request with a selected system component identifier selected from the more than one system component identifiers in dependence on a type of data processing activity being carried out in support of which the data access request is issued.

16. A method of operating a system cache to provide data caching in response to data access requests from plural system components, the method comprising the steps of:
storing blocks of data items in plural entries of data caching storage, each entry storing a block of data items and each block of data items comprising plural sectors of data items, and each block of data items being stored in an entry of the data caching storage with an associated address portion;

storing in sector use prediction circuitry sets of sector use patterns in a set of pattern entries and in response to a data access request received from a system component specifying one or more data items selecting a selected pattern entry in dependence on a system component identifier in the data access request, and generating a sector use prediction in dependence on the sector use pattern in the selected pattern entry; and retrieving one or more further data items in dependence on the sector use prediction, wherein the sector use prediction circuitry comprises sector use counters, and is responsive to the data access request received from the system component, in order to select a subset of the sector use counters, wherein the sector use pattern is given by counter values of the subset of the sector use counters, wherein the retrieving is responsive to a hit signal from the data caching storage indicating a cache hit and a sector hit, and to sector validity information indicating that the one or more further data items indicated by the sector use prediction are not currently stored in the data caching storage, to initiate a data filling process for the entry comprising retrieving the one or more further data items.

17. A system cache to provide data caching in response to data access requests from plural system components, the system cache comprising:

means for storing blocks of data items in plural entries of data caching storage, each entry storing a block of data items and each block of data items comprising plural sectors of data items, and each block of data items being stored in an entry of the data caching storage with an associated address portion;

sector use prediction means for storing sets of sector use patterns in a set of pattern entries and in response to a data access request received from a system component specifying one or more data items selecting a selected pattern entry in dependence on a system component identifier in the data access request, and for generating a sector use prediction in dependence on the sector use pattern in the selected pattern entry; and means for retrieving one or more further data items in dependence on the sector use prediction, wherein the sector use prediction means comprises sector use counters, and is responsive to the data access request received from the system component, in order to select a subset of the sector use counters, wherein the sector use pattern is given by counter values of the subset of the sector use counters, wherein the means for retrieving is responsive to a hit signal from the data caching storage indicating a cache hit and a sector hit, and to sector validity information indicating that the one or more further data items indicated by the sector use prediction are not currently stored in the data caching storage, to initiate a data filling process for the entry comprising retrieving the one or more further data items.

* * * * *